US012629873B2

(12) United States Patent
Mitani

(10) Patent No.: US 12,629,873 B2
(45) Date of Patent: May 19, 2026

(54) MOLD CLAMPING DEVICE AND INJECTION MOLDING MACHINE

(71) Applicant: THE JAPAN STEEL WORKS, LTD., Tokyo (JP)

(72) Inventor: Souma Mitani, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 49 days.

(21) Appl. No.: 18/578,625

(22) PCT Filed: May 26, 2022

(86) PCT No.: PCT/JP2022/021658
§ 371 (c)(1),
(2) Date: Jan. 11, 2024

(87) PCT Pub. No.: WO2023/286470
PCT Pub. Date: Jan. 19, 2023

(65) Prior Publication Data
US 2024/0286326 A1 Aug. 29, 2024

(30) Foreign Application Priority Data
Jul. 16, 2021 (JP) ................................. 2021-117640

(51) Int. Cl.
*B29C 45/04* (2006.01)
*B29C 45/66* (2006.01)

(52) U.S. Cl.
CPC ...... *B29C 45/0441* (2013.01); *B29C 45/0408* (2013.01); *B29C 45/66* (2013.01)

(58) Field of Classification Search
CPC ............................ B29C 45/0441; B29C 45/06
See application file for complete search history.

(56) References Cited

U.S. PATENT DOCUMENTS

| | | | | |
|---|---|---|---|---|
| 2,828,508 A | * | 4/1958 | Labarre | B29C 45/06 |
| | | | | 425/576 |
| 3,517,975 A | * | 6/1970 | Davidson | F16C 19/38 |
| | | | | 384/619 |
| 2018/0355917 A1 | | 12/2018 | Iizumi et al. | |

FOREIGN PATENT DOCUMENTS

| | | | |
|---|---|---|---|
| CN | 106738605 | * | 5/2017 |
| CN | 108291610 A | | 7/2018 |
| CN | 111873310 | * | 11/2020 |
| JP | 10-264200 A | | 10/1998 |
| JP | 2000-271829 A | | 10/2000 |
| JP | 2006-103203 A | | 4/2006 |

(Continued)

OTHER PUBLICATIONS

JP2013184444 machine translation (Year: 2013).*

(Continued)

*Primary Examiner* — Alison L Hindenlang
*Assistant Examiner* — Alexander A Wang
(74) *Attorney, Agent, or Firm* — Sughrue Mion, PLLC

(57) ABSTRACT

The present invention relates to a mold clamping device that includes: a fixed platen to which a mold is attachable; a movable platen configured to move closer towards or away from the fixed platen; and a rotary platen disposed to face a surface of the movable platen facing the fixed platen and to which a mold is attachable. A cylindrical protrusion is fixedly installed on the surface of the movable platen facing the fixed platen. The rotary platen is rotatably connected to the protrusion via a bearing structure.

2 Claims, 3 Drawing Sheets

(56)                    References Cited

FOREIGN PATENT DOCUMENTS

| | | |
|---|---|---|
| JP | 2009-45939 A | 3/2009 |
| JP | 2013-49142 A | 3/2013 |
| JP | 2013-184444 A | 9/2013 |

OTHER PUBLICATIONS

BRS, "Cross roller bearing design—Detailed analysis of each component" (Year: 2020).*
CN106738605 machine translation (Year: 2017).*
CN111873310 machine translation (Year: 2020).*
JPH10264200 machine translation (Year: 1998).*
Office Action dated Jul. 31, 2024, issued by Japanese Intellectual Property Office for Japanese Application No. 2021-117640.
International Search Report (PCT/ISA/210) issued Jun. 28, 2022 by the International Searching Authority in International Patent Application No. PCT/IJP2022/021658.
Written Opinion (PCT/ISA/237) issued Jun. 28, 2022 by the International Searching Authority in International Patent Application No. PCT/IJP2022/021658.
Communication issued on Mar. 31, 2026 by the China National Intellectual Property Administration in Chinese Patent Application No. 202280049455.5.

\* cited by examiner

MOLD CLAMPING DEVICE AND INJECTION MOLDING MACHINE

CROSS-REFERENCE TO RELATED APPLICATIONS

This application is a National Phase Entry of PCT International Application No. PCT/JP2022/021658, filed on May 26, 2022, which claims priority to Japanese Patent Application No. 2021-117640 filed on Jul. 16, 2021, the contents of all of which are incorporated herein by reference in their entirety.

TECHNICAL FIELD

The present invention relates to a mold clamping device including a rotary platen that rotates a mold, and an injection molding machine.

BACKGROUND ART

A mold clamping device provided in an injection molding machine includes a fixed platen and a movable platen that is opened and closed with respect to the fixed platen. In an injection molding machine including a rotary platen for rotating a mold, the rotary platen is provided on either one mold platen of a fixed platen and a movable platen. As described in Patent Literature 1, for example, the rotary platen is often provided on the movable platen. The rotary platen is provided to face the movable platen so as to rotate. Then, a plurality of molds, that is, rotary-side molds are attached. When the molds are clamped, one of the plurality of rotary-side molds is clamped with a fixed-side mold attached to the fixed platen. When a rotation position of the rotary platen is changed and the molds are clamped, another rotary-side mold is clamped with the fixed-side mold.

CITATION LIST

Patent Literature

Patent Literature 1: JP2009-45939A

SUMMARY OF INVENTION

Technical Problem

The rotary platen includes a rotary shaft, and the rotary shaft is inserted into a through hole formed at the center of the movable platen. A bearing is provided between the through hole and the rotary shaft, and the rotary shaft is rotatably supported. The movable platen is provided with a drive mechanism for driving the rotary shaft, and the drive mechanism rotates the rotary platen.

When the bearing that rotatably supports the rotary shaft is repeatedly subjected to a mold clamping force, the bearing is worn due to deterioration over time. This causes the rotary shaft to be inclined with respect to the through hole. When the rotary shaft is inclined, the rotary platen is inclined with respect to the movable platen. If the rotary platen rotates in such a state, the movable platen and the rotary platen will come into contact with each other which causes wear. There is a problem that parallelism of the rotary platen is shifted and accuracy of mold clamping is reduced.

In view of the above problems, an object of the present disclosure is to provide a mold clamping device including a rotary platen that prevents an inclination during rotation.

Other problems and novel features will become apparent from description of the present description and the accompanying drawings.

Solution to Problem

The present inventors have found that the above problems can be solved by adopting the following configurations. That is, a cylindrical protrusion is fixedly provided on a surface of a movable platen facing a fixed platen. A rotary platen is rotatably provided on the protrusion via a bearing structure.

A solution to the above problem is as follows.

<1>

A mold clamping device including:

a fixed platen, a mold being attachable to the fixed platen;

a movable platen configured to move closer toward or away from the fixed platen; and a rotary platen disposed to face a surface of the movable platen facing the fixed platen, a mold being attachable to the rotary platen, in which a cylindrical protrusion is fixedly installed on the surface of the movable platen facing the fixed platen, and in which the rotary platen is rotatably connected to the protrusion via a bearing structure.

<2>

The mold clamping device according to <1>, in which a circular recess is formed on a surface of the rotary platen facing the movable platen, and the protrusion is designed to be accommodated in the recess.

<3>

The mold clamping device according to <1> or <2>, in which the bearing structure is a cross roller ring, the cross roller ring including: an inner ring; an outer ring that is rotatable relative to the inner ring; and a plurality of rollers that are provided between the inner ring and the outer ring.

<4>

The mold clamping device according to <3>, in which the inner ring is fitted to the protrusion, and the outer ring is fixed to the rotary platen.

<5>

The mold clamping device according to <3> or <4>, in which the protrusion is provided with a pressing member for fixing the inner ring to the surface of the movable platen facing the fixed platen.

<6>

The mold clamping device according to <1> or <2>, in which the bearing structure is a sliding bearing.

<7>

The mold clamping device according to any one of <1> to <6>, in which one of the rotary platen and the movable platen is provided with a friction reducing plate-form member on a surface that faces the other platen.

<8>

The mold clamping device according to <7>, in which the friction reducing plate-form member is configured to be separated from the other platen when the rotary platen rotates and comes into contact with the other platen during mold clamping.

<9>

An injection molding machine including:

a mold clamping device configured to clamp a mold; and an injection device configured to inject an injection material, in which the mold clamping device includes:

a fixed platen, a mold being attachable to the fixed platen;

a movable platen configured to move closer towards or away from the fixed platen; and a rotary platen disposed to face a surface of the movable platen facing the fixed platen, a mold being attachable to the rotary platen, in which a cylindrical protrusion is fixedly installed on the surface of the movable platen facing the fixed platen, and in which the rotary platen is rotatably connected to the protrusion via a bearing structure.

<10>

The injection molding machine according to <9>, in which a circular recess is formed on a surface of the rotary platen facing the movable platen, and the protrusion is designed to be accommodated in the recess.

<11>

The injection molding machine according to <9> or <10>, in which the bearing structure is a cross roller ring, the cross roller ring including: an inner ring; an outer ring that is rotatable relative to the inner ring; and a plurality of rollers that are provided between the inner ring and the outer ring.

<12>

The injection molding machine according to <11>, in which the inner ring is fitted to the protrusion, and the outer ring is fixed to the rotary platen.

<13>

The injection molding machine according to <11> or <12>, in which the protrusion is provided with a pressing member for fixing the inner ring to the surface of the movable platen facing the fixed platen.

<14>

The injection molding machine according to <9> or <10>, in which the bearing structure is a sliding bearing.

<15>

The injection molding machine according to any one of <9> to <14>, in which one of the rotary platen and the movable platen is provided with a friction reducing plate-form member on a surface that faces the other platen.

<16>

The injection molding machine according to <15>, in which the friction reducing plate-form member is configured to be separated from the other platen when the rotary platen rotates and come into contact with the other platen during mold clamping.

Advantageous Effects of Invention

According to the present disclosure, it is possible to suppress the inclination of the rotary platen during rotation.

DESCRIPTION OF EMBODIMENTS

Figure 1:
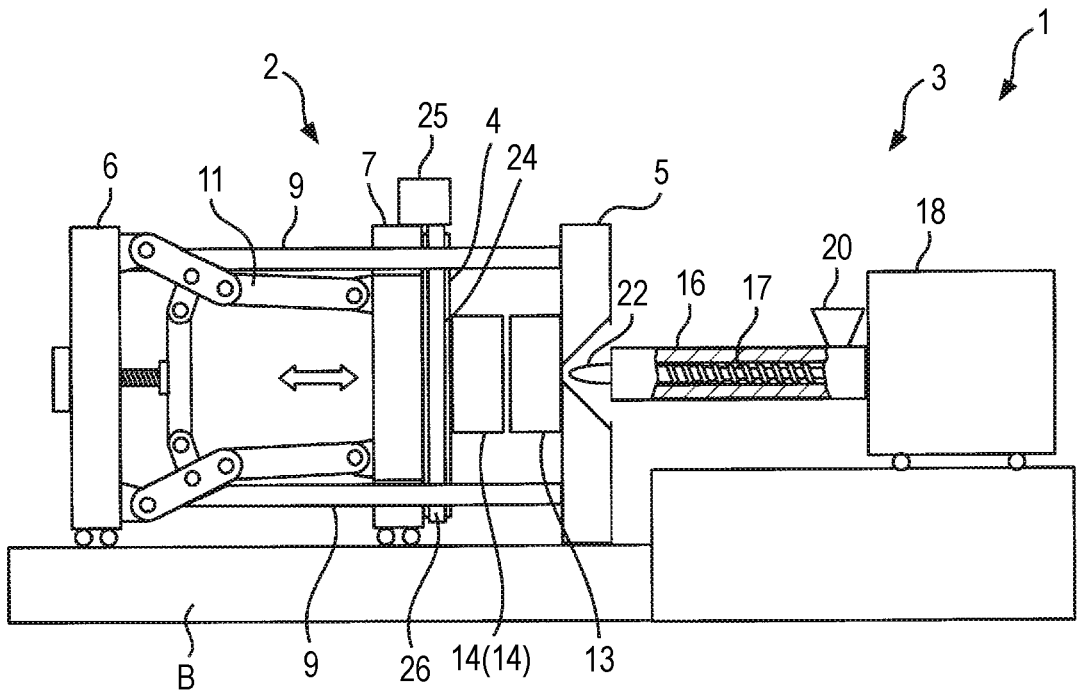
FIG. 1 is a side view of an injection molding machine according to the present illustrative embodiment.

Hereinafter, specific illustrative embodiments will be described in detail with reference to the drawings. However, the present invention is not limited to the following illustrative embodiments. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

The present illustrative embodiment will be described.

A mold clamping device according to an illustrative embodiment of the present invention includes:

a fixed platen, a mold being attachable to the fixed platen;

a movable platen configured to move closer towards or away from the fixed platen; and a rotary platen disposed to face a surface of the movable platen facing the fixed platen, a mold being attachable to the rotary platen, in which a cylindrical protrusion is fixedly installed on the surface of the movable platen facing the fixed platen, and in which the rotary platen is rotatably connected to the protrusion via a bearing structure.

An injection molding machine according to an illustrative embodiment of the present invention includes:

a mold clamping device configured to clamp a mold; and an injection device configured to inject an injection material, in which the mold clamping device includes:

a fixed platen, a mold being attachable to the fixed platen;

a movable platen configured to move closer towards or away from the fixed platen; and a rotary platen disposed to face a surface of the movable platen facing the fixed platen, a mold being attachable to the rotary platen, in which a cylindrical protrusion is fixedly installed on the surface of the movable platen facing the fixed platen, and in which the rotary platen is rotatably connected to the protrusion via a bearing structure.

<Injection Molding Machine>

As shown in FIG. 1, an injection molding machine 1 according to the present illustrative embodiment includes a mold clamping device 2 for clamping a mold, an injection device 3 for melting and injecting an injection material, and a rotary platen 4 provided on the mold clamping device 2.

<Mold Clamping Device>

The mold clamping device 2 includes a fixed platen 5 fixed on a bed B, a mold clamping housing 6 that slides on the bed B, and a movable platen 7 that also slides on the bed B. The fixed platen 5 and the mold clamping housing 6 are coupled by a plurality of, for example, four tie bars 9, 9 . . . . . The movable platen 7 is slidable between the fixed platen 5 and the mold clamping housing 6. A mold clamping mechanism 11 is provided between the mold clamping housing 6 and the movable platen 7. The mold clamping mechanism 11 may be implemented by a direct pressure type mold clamping mechanism, that is, a mold clamping cylinder. In the present illustrative embodiment, the mold clamping mechanism 11 is implemented by a toggle mechanism.

As will be described in detail later, the rotary platen 4 according to the present illustrative embodiment is provided on the movable platen 7. The fixed platen 5 is provided with a fixed-side mold 13. The rotary platen 4 is provided with two rotary-side molds 14, 14. In FIG. 1, the two rotary-side molds 14, 14 attached to the rotary platen 4 are provided on a front side and a back side of the paper surface, and are shown in an overlapping manner. One of the two rotary-side molds 14, 14 is aligned with the fixed-side mold 13 according to a rotation position of the rotary platen 4. When the mold clamping mechanism 11 is driven, the fixed-side mold 13 and one rotary-side mold 14 aligned therewith are opened and closed.

<Injection Device>

The injection device 3 includes a heating cylinder 16, a screw 17 inserted in the heating cylinder 16, and a screw driving device 18 configured to drive the screw 17. A hopper 20 is provided in the vicinity of a rear end portion of the heating cylinder 16. An injection nozzle 22 is provided at a tip end of the heating cylinder 16.

<Rotary Platen>

Figure 2:
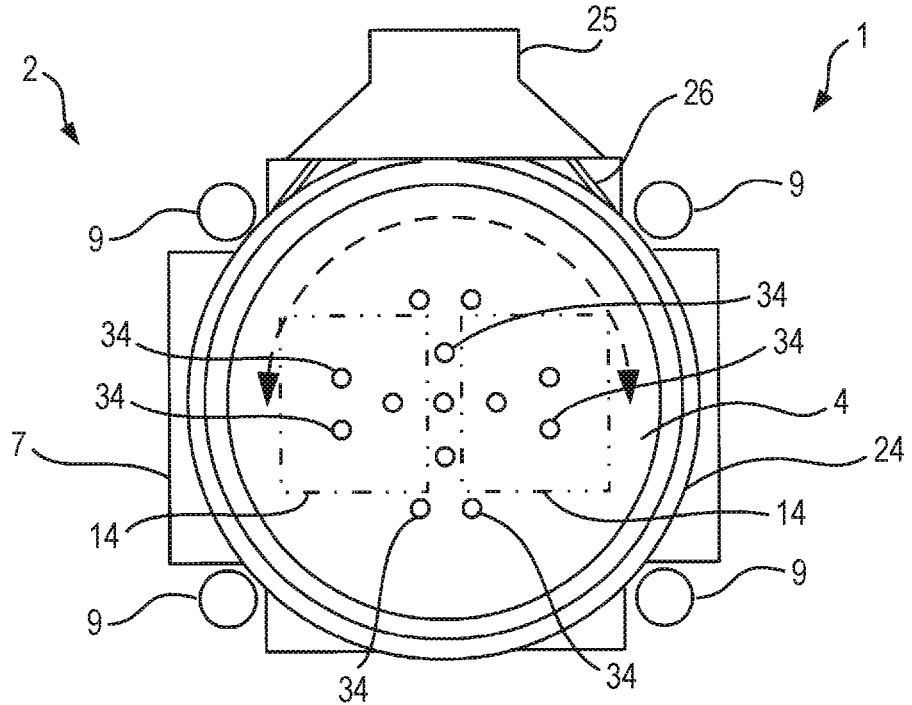
FIG. 2 is a front view showing a rotary platen and a part of a mold clamping device according to the present illustrative embodiment.

The rotary platen 4 is provided on the movable platen 7 as described above. FIG. 2 shows the rotary platen 4 and the movable platen 7 when viewed from a direction perpendicular to the rotary platen 4. The rotary platen 4 rotates smoothly with respect to the movable platen 7. A rotary platen driving mechanism 25 is provided above the movable platen 7. A pulley 24 having a diameter slightly larger than that of the rotary platen 4 is fixed to the rotary platen 4. As shown in FIGS. 1 and 2, a belt 26 is wound around the pulley 24 and the rotary platen driving mechanism 25. When the rotary platen driving mechanism 25 is driven, the pulley 24 and the rotary platen 4 rotate integrally.

In an illustrative embodiment of the present invention, it is preferable that one of the rotary platen and the movable platen is provided with a friction reducing plate-form member on a surface that faces the other platen.

Figure 3:
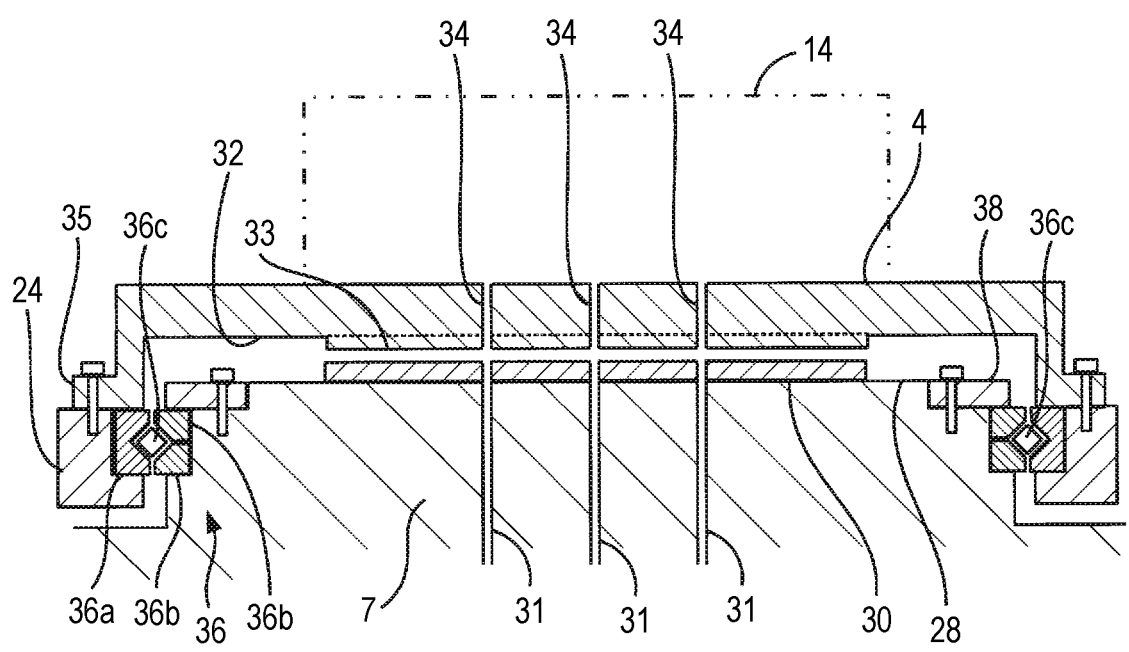
FIG. 3 is a side sectional view showing a movable platen and the rotary platen according to the present illustrative embodiment.

FIG. 3 is a side cross-sectional view of the movable platen 7 and the rotary platen 4. A protrusion 28 that rises in a cylindrical shape is formed at a central portion in a surface of the movable platen 7 facing the fixed platen 5 (see FIG. 1). The friction reducing plate-form member is provided on an upper surface of the protrusion 28. In the present illustrative embodiment, the friction reducing plate-form member is made of a wear plate 30 formed by sintering a solid lubricant mainly composed of graphite uniformly dispersed in an alloy.

A diameter of the protrusion 28 is smaller than a diameter of the rotary platen 4, but is sufficiently large in the movable platen 7, and the protrusion 28 largely occupies a central portion of the movable platen 7. Further, an area of the wear plate 30 also increases. As will be described later, at the time of mold clamping, the rotary platen 4 is slightly elastically deformed by a mold clamping force received from the rotary-side mold 14, and comes into close contact with the wear plate 30. Since the protrusion 28 and the wear plate 30 are sufficiently large, the mold clamping force appropriately acts on the movable platen 7. The movable platen 7 and the wear plate 30 have a plurality of holes through which ejector rods pass, that is, ejector rod holes 31, 31, . . . .

With respect to such a movable platen 7, the rotary platen 4 is formed with a circular recess 32 at a side facing the movable platen 7 as shown in FIG. 3. The protrusion 28 of the movable platen 7 is accommodated in the recess 32. By forming such a recess 32, a flange portion 35 is formed on a circumferential portion of the rotary platen 4.

As described above, in the illustrative embodiment of the present invention, it is preferable that a circular recess is formed on a surface of the rotary platen facing the movable platen, and the protrusion is accommodated in the recess.

A slightly raised base portion 33 is formed on a surface of the recess 32, that is, on a surface of the rotary platen 4 that faces the wear plate 30. A slight gap is secured between the base portion 33 and the wear plate 30 so as not to come into contact with each other when the rotary platen 4 rotates. However, at the time of mold clamping, the rotary platen 4 is slightly elastically deformed by the mold clamping force received from the rotary-side mold 14, and the base portion 33 and the wear plate 30 are brought into close contact with each other. The rotary platen 4 is also provided with ejector rod holes 34, 34, . . . .

As described above, in the illustrative embodiment of the present invention, it is preferable that the friction reducing plate-form member is configured to be separated from the other platen on which the friction reducing plate-form member is not provided when the rotary platen rotates and comes into contact with the other platen during mold clamping.

<Bearing Structure>

The rotary platen 4 according to the present illustrative embodiment is rotatably supported by a bearing structure 36 on the flange portion 35 thereof with respect to the cylindrical protrusion 28 of the movable platen 7. That is, the bearing structure 36 is provided not in the vicinity of the center but on the circumferential portion of the rotary platen 4. That is, the rotary platen 4 according to the present illustrative embodiment is rotatably supported at an outer peripheral portion thereof with respect to the fixed protrusion 28.

In the illustrative embodiment of the present invention, it is preferable that the bearing structure is a cross roller ring. The cross roller ring includes an inner ring, an outer ring that is rotatable relative to the inner ring, and a plurality of rollers provided between the inner ring and the outer ring.

Figure 4:
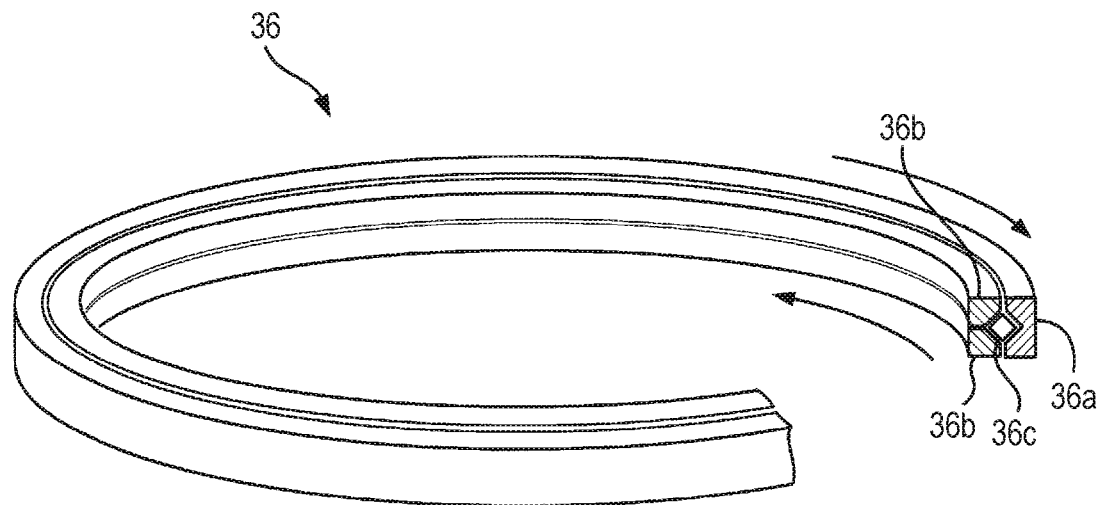
FIG. 4 is a perspective view showing a cross roller ring provided on the rotary platen according to the present illustrative embodiment in a partial cross section.

In the present illustrative embodiment, the bearing structure 36 is a cross roller ring 36 shown in FIG. 4. The cross roller ring 36 is a bearing component having a special shape, and has a ring shape as a whole. The cross roller ring 36 includes an outer ring 36a, a pair of inner rings 36b, 36b, and a large number of rollers 36c, 36c, . . . interposed therebetween. The rollers 36c, 36c, . . . have a cylindrical shape and roll between the outer ring 36a and the pair of inner rings 36b, 36b. Therefore, in the cross roller ring 36, the pair of inner rings 36b, 36b rotate smoothly relative to the outer ring 36a.

In the illustrative embodiment of the present invention, it is preferable that the inner ring of the cross roller ring is fitted to the protrusion, and the outer ring is fixed to the rotary platen.

It is preferable that the protrusion is provided with a pressing member for fixing the inner ring to a surface of the movable platen facing the fixed platen.

As shown in FIG. 3, the cross roller ring 36 is provided on a circumferential portion of the protrusion 28 of the movable platen 7. The pair of inner rings 36b, 36b are fixed by the pressing member 38. On the other hand, the outer ring 36a of the cross roller ring 36 is provided on the circumferential portion of the rotary platen 4. That is, the pulley 24 having a large diameter is provided on the flange portion 35 of the rotary platen 4, and the outer ring 36a is fixed by the flange portion 35 and the pulley 24. As a result, the rotary platen 4 smoothly rotates relative to the movable platen 7.

The rotary platen 4 according to the present illustrative embodiment is provided on the protrusion 28 of the movable platen 7 via the bearing structure 36 in the circumferential portion of the rotary platen 4. Accordingly, even if the bearing structure 36 is deteriorated due to long-term operation, the parallelism of the rotary platen 4 is easily maintained and stable rotation is ensured. Further, in the present illustrative embodiment, the bearing structure 36 includes a rolling bearing. Therefore, wearing out is less likely even after prolonged operation. Therefore, the problem of the rotary platen 4 becoming loose is less likely to occur. That is, the rotary platen 4 can be rotated stably and accurately for a long period of time. The effect of stabilizing the mold clamping accuracy is also obtained.

<Rotary Platen in Related Art>

Figure 5:
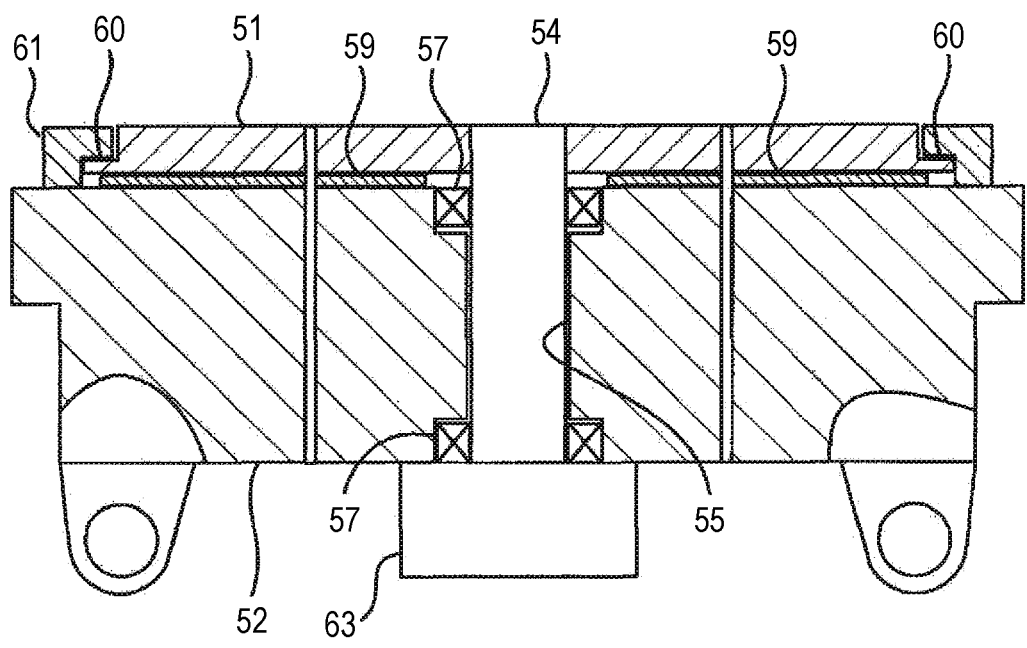
FIG. 5 is a side sectional view showing a movable platen and a rotary platen in the related art.

A movable platen 52 including a rotary platen 51 in the related art is shown in FIG. 5. A rotary shaft 54 is fixed to the center of the rotary platen 51 in the related art. A through hole 55 is formed in the center of the movable platen 52, and the rotary shaft 54 is inserted into the through hole 55 via bearings 57 and 57. The movable platen 52 is provided with a sliding bearing formed of wear plates 59, 59, and the rotary platen 51 is configured to rotate slidably relative to the wear plates 59, 59. A step portion 60 is formed in a circumferential portion of the rotary platen 51. The step portion 60 is pressed by a pressing member 61 fixed to the movable platen 52. Therefore, even if a mold opening force is applied, the rotary platen 51 does not separate from the movable platen 52. The movable platen 52 is provided with a drive mechanism 63 for driving the rotary shaft 54, so that the rotary platen 51 is rotated via the rotary shaft 54.

In the related art, the rotary platen 51 is rotatably supported on the rotary shaft 54 by the bearings 57, 57, as described above. In other words, the rotary platen 51 is rotatably supported at the center thereof. When the bearings 57, 57 deteriorate due to long-term operation, there is a problem that the rotary shaft 54 tends to incline, and the rotary platen 51 inclines. In addition, there is also a problem that the rotary platen 51 and the wear plates 59 and 59 are easily worn due to sliding during rotation. There is a problem that the wear of the wear plates 59 and 59 due to the long-term operation causes rattling of the rotary platen 51, and mold clamping cannot be performed with high accuracy. The rotary platen 4 (see FIG. 3) according to the present illustrative embodiment solves this problem. This is because, as described above, even if the rotary platen 4 is operated for a long period of time, the parallelism of the rotary platen 4 is easily maintained and stable rotation is ensured. This is because the problem of rattling is less likely to occur even after a long period of time.

<Modification of Rotary Platen>

Figure 6:
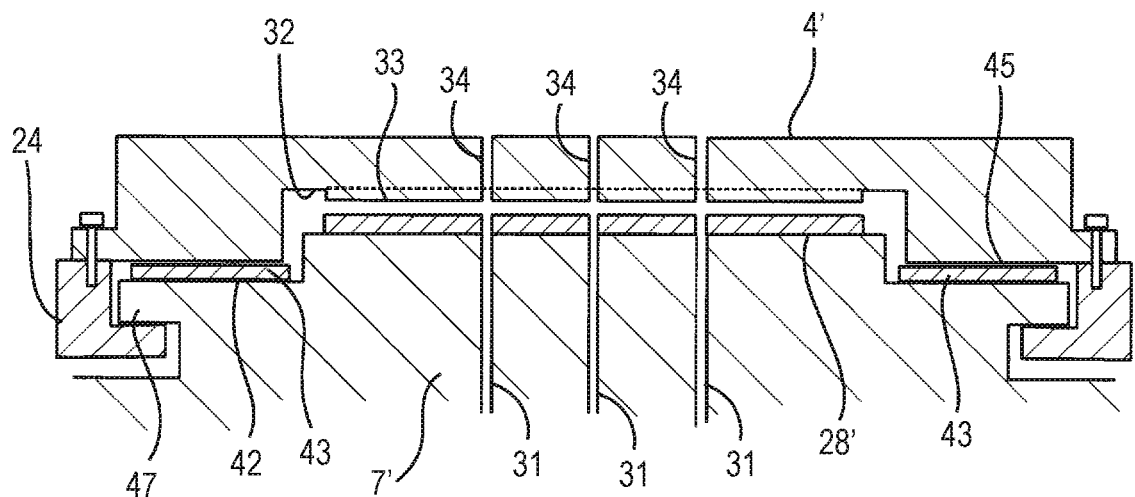
FIG. 6 is a side sectional view showing a movable platen and a rotary platen according to a second illustrative embodiment.

Various modifications are possible for the rotary platen 4 according to the present illustrative embodiment. FIG. 6 shows a rotary platen 4' according to a second illustrative embodiment. Components and members similar to those of the rotary platen 4 and the movable platen 7 according to the first illustrative embodiment are denoted by the same reference numerals, and description thereof is omitted.

In the second illustrative embodiment, a step portion 42 is formed around a cylindrical protrusion 28' on the movable platen 7'. The step portion 42 is provided with wear plates 43 and 43. On the other hand, a slide portion 45 having a donut shape is formed around the circular recess 32 on the rotary platen 4'. The slide portion 45 slides on the wear plates 43 and 43 of the step portion 42. That is, the bearing structure connecting the rotary platen 4' and the movable platen 7' in the second illustrative embodiment is composed of a sliding bearing including the step portion 42, the wear plates 43 and 43, and the slide portion 45. The bearing structure is also provided on a circumferential portion of the rotary platen 4'. As a result, the rotary platen 4' is less likely to incline, and the parallelism is maintained for a long period of time.

As described above, it is also a preferable aspect that the bearing structure in the illustrative embodiment of the present invention is a sliding bearing.

In the second illustrative embodiment, a collar portion 47 is formed in the step portion 42 formed in the movable platen 7'. The rotary platen 4' and the pulley 24 sandwich the collar portion 47. Accordingly, the rotary platen 4' does not separate from the movable platen 7' when the mold is opened.

Other Modifications

In the rotary platen 4 (see FIG. 3) according to the present illustrative embodiment, it has been described that the wear plate 30 and the base portion 33 are not in contact with each other at the time of rotation, and are in close contact with each other at the time of mold clamping. However, the wear plate 30 and the base portion 33 may slide at the time of rotation. Further, the wear plate 30 is not an essential member, and the formation of the base portion 33 is also not essential.

Although the invention made by the present inventors is specifically described based on the illustrative embodiment, it is needless to say that the present invention is not limited to the illustrative embodiment described above, and various modifications can be made without departing from the scope of the invention. The plurality of examples described above may be appropriately combined.

INDUSTRIAL APPLICABILITY

According to the present disclosure, it is possible to provide a mold clamping device including a rotary platen capable of preventing inclination during rotation and an injection molding machine.

Although the present invention has been described in detail with reference to a specific illustrative embodiment, it will be apparent to those skilled in the art that various changes and modifications can be made without departing from the spirit and scope of the present invention.

REFERENCE SIGNS LIST

1 Injection molding machine
2 Mold clamping device
3 Injection device
4, 4' Rotary platen
5 Fixed platen
6 Mold clamping housing
7 Movable platen
9 Tie bar
11 Mold clamping mechanism
13 Fixed-side mold
14 Rotary-side mold
16 Heating cylinder
17 Screw
18 Screw driving device
20 Hopper
22 Injection nozzle
24 Pulley
25 Rotary platen driving mechanism 26 Belt
28, 28' Protrusion
30 Wear plate
31 Ejector rod hole
32 Recess
33 Base portion
34 Ejector rod hole
35 Flange portion
36 Cross roller ring
36a Outer ring
36b Inner ring
36c Roller
38 Pressing member
42 Step portion
43 Wear plate
45 Slide portion
47 Collar portion
B Bed
51 Rotary platen
52 Movable platen
54 Rotary shaft
55 Through hole
57 Bearing
59 Wear plate
60 Step portion
61 Pressing member
63 Drive mechanism

The invention claimed is:

1. A mold clamping device comprising:

fixed platen, a first mold being attachable to the fixed platen;

a movable platen configured to move closer toward or away from the fixed platen;

a rotary platen disposed to face a surface of the movable platen facing the fixed platen, a second mold being attachable to the rotary platen, wherein a cylindrical protrusion is fixedly installed on the surface of the movable platen facing the fixed plate; and a bearing structure that connects the rotary platen to the protrusion rotatably, wherein a circular recess is formed on a surface of the rotary platen facing the movable platen, and the protrusion is designed to be accommodated in the recess, wherein the bearing structure is a cross roller ring, the cross roller ring including: a pair of inner rings; an outer ring that is rotatable relative to the pair of inner rings; and a plurality of rollers that are provided between the pair of inner rings and the outer ring, wherein the pair of inner rings is fitted to the protrusion and is fixed to the protrusion by a pressing member, and the outer ring is fixed by being sandwiched by the rotary platen and a pulley configured to rotate the rotary platen, wherein one of the protrusion and the recess is provided with a friction reducing plate-form member on a surface that faces the other, and wherein the friction reducing plate-form member is configured to be separated from the other when the rotary platen rotates and comes into close contact with the other by elastic deformation of the rotary platen during mold clamping.

2. An injection molding machine comprising:

a mold clamping device configured to clamp a mold; and an injection device configured to inject an injection material, wherein the mold clamping device comprising:

a fixed platen, a first mold being attachable to the fixed platen;

a movable platen configured to move closer toward or away from the fixed platen;

a rotary platen disposed to face a surface of the movable platen facing the fixed platen, a second mold being attachable to the rotary platen, wherein a cylindrical protrusion is fixedly installed on the surface of the movable platen facing the fixed plate; and a bearing structure that connects the rotary platen to the protrusion rotatably, wherein a circular recess is formed on a surface of the rotary platen facing the movable platen, and the protrusion is designed to be accommodated in the recess, wherein the bearing structure is a cross roller ring, the cross roller ring including: a pair of inner rings; an outer ring that is rotatable relative to the pair of inner rings; and a plurality of rollers that are provided between the pair of inner rings and the outer ring, wherein the pair of inner rings is fitted to the protrusion and is fixed to the protrusion by a pressing member, and the outer ring is fixed by being sandwiched by the rotary platen and a pulley configured to rotate the rotary platen, wherein one of the protrusion and the recess is provided with a friction reducing plate-form member on a surface that faces the other, and wherein the friction reducing plate-form member is configured to be separated from the other when the rotary platen rotates and comes into close contact with the other by elastic deformation of the rotary platen during mold clamping.

* * * * *